United States Patent [19]
Vogt

[11] Patent Number: 5,228,305
[45] Date of Patent: Jul. 20, 1993

[54] DRIVER-ADJUSTABLE SYSTEM FOR IMPROVING VEHICLE PERFORMANCE

[76] Inventor: Ernest C. Vogt, 723 McKay Dr., Arlington, Tex. 76010

[21] Appl. No.: 726,851

[22] Filed: Jul. 8, 1991

[51] Int. Cl.$^5$ .................... B60H 1/32; F02B 77/00
[52] U.S. Cl. ........................... 62/133; 62/126; 62/243; 62/323.4; 123/198 R
[58] Field of Search .............. 62/133, 323.4, 126, 62/163, 230, 243; 123/198 R

[56] References Cited

U.S. PATENT DOCUMENTS

| | | | |
|---|---|---|---|
| 4,135,368 | 1/1979 | Mohr et al. | 62/133 |
| 4,269,033 | 5/1981 | Birch | 62/133 |
| 4,299,094 | 11/1981 | Lummen | 62/133 |
| 4,305,258 | 12/1981 | Spencer, Jr. | 62/133 |
| 4,355,523 | 10/1982 | Shimada | 62/133 |
| 4,359,875 | 11/1982 | Ohtani | 62/133 |
| 4,369,634 | 1/1983 | Ratto | 62/133 X |
| 4,391,242 | 7/1983 | Mashio | 62/133 X |
| 4,445,341 | 5/1984 | Hayashi | 62/133 |
| 4,556,942 | 12/1985 | Russo et al. | 62/133 X |
| 4,688,530 | 8/1987 | Nishikawa | 123/198 R |
| 4,823,555 | 4/1989 | Ohkumo | 62/133 |

*Primary Examiner*—John Rivell
*Attorney, Agent, or Firm*—Charles W. McHugh

[57] ABSTRACT

A user-adjustable control system monitors an electrical signal indicative of manifold pressure in an internal combustion engine that powers a wheeled vehicle. The engine simultaneously powers the drive train of the vehicle and, when a thermostat so dictates, an air conditioning compressor. This system improves vehicle driving performance by selectively restricting the diversion of engine power from the drive train to operate the air conditioning compressor, based on threshold changes in a monitored electrical signal. With electronic circuitry the system selectively disengages power to the compressor when the difference between manifold and atmospheric pressure drops below a preset value. The system includes a transducer connected to provide an electrical output signal that is indicative of pressure changes in the engine manifold. The manifold pressure changes are, in turn, indicative of changes in the engine's load conditions. Electronic circuitry compares the transducer output signal with a preset value, and provides a control signal to a relay to disengage the compressor when the transducer output signal is less than the preset value. The circuitry includes an adjustment knob in the passenger compartment of the vehicle for selectively modifying the preset value to adjust the pressure at which the relay disengages the compressor. Adjustment may take place while the engine is running and a driver is operating the vehicle. Hence, a driver may make a choice, as often as desired, between comfort and improved fuel economy-by adjusting the point at which power will not be diverted to the compressor.

14 Claims, 7 Drawing Sheets

(80)

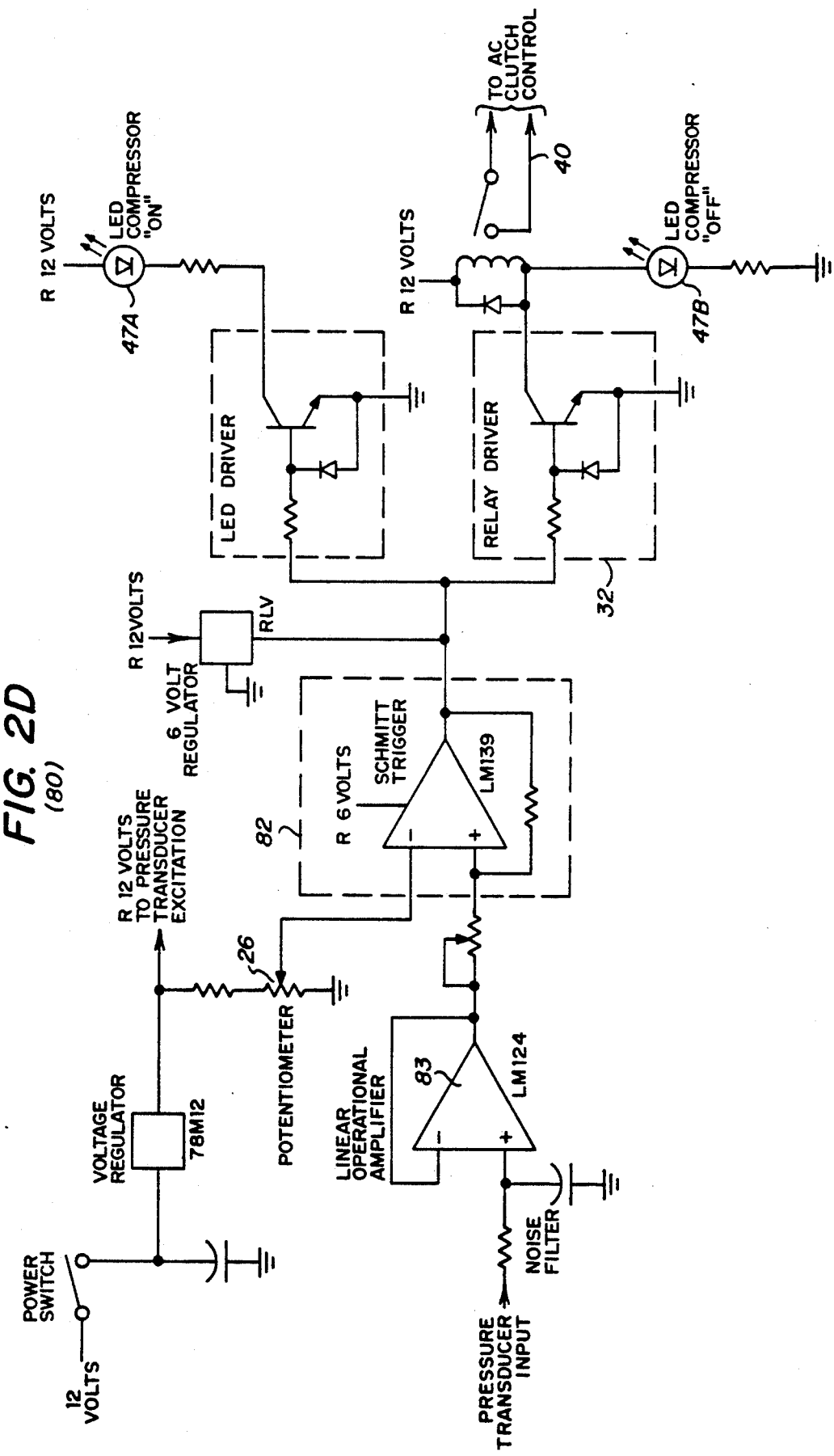
FIG. 2D (80)

DRIVER-ADJUSTABLE SYSTEM FOR IMPROVING VEHICLE PERFORMANCE

FIELD OF THE INVENTION

This invention relates generally to control systems for allocating engine power between a vehicle drive train and a power-draining accessory such as an air conditioner or defroster. More specifically, it relates to a user-controllable electronic system that improves the performance of an over-the-road vehicle by controllably restricting the diversion of engine power from the vehicle drive train by selectively (and temporarily) removing the load of an air conditioning compressor from the engine.

BACKGROUND OF THE INVENTION

Numerous electromechanical systems have been proposed to control allocation of engine power to automotive vehicle accessories, particularly air conditioners. Generally the intent of such systems has been to cut off the normal diversion of engine power to an accessory device in order to allocate maximum power to the vehicle drive train, especially during intervals of rapid acceleration and hill climbing when vehicle performance requires the greatest possible power transfer to the drive train.

The motivation for developing allocation systems of the prior art stemmed, of course, from either the desire to increase economy or to maximize performance. By temporarily turning off accessory equipment, a portion of an engine's reserve power becomes immediately available to the drive train, and less additional power must be generated to achieve a desired level of vehicle acceleration. Secondly, there has been a recent trend to compromise overall engine capacity in order to meet challenging fuel consumption and emissions standards. Indeed, with the relatively small engines now found in many compact and mid-size cars, undesirable tradeoffs between vehicle economy and reserve power pervade the automotive industry.

Vehicles equipped with relatively small engines normally provide sufficient power for air conditioning, even when the vehicle is fully encumbered with passengers or cargo. Nonetheless, when these small-engine vehicles operate under such laden conditions, they are known to have some difficulty providing sufficient power for rapid climbing of hills or for accelerations of the type necessary to quickly pass other vehicles on the open road. On the other hand, larger and more powerful engines, i.e., those possessing sufficient reserve power under all load conditions, are often less fuel efficient. That is, vehicles equipped with higher output—but less efficient—engines are sometimes referred to as gas guzzlers because they consume substantial amounts of fuel when delivering large and rapid bursts of power.

To compensate for the shortcomings in power and fuel economy exhibited by small and large engines, respectively, several systems have been proposed for disabling automotive accessories from the engine during intervals when peak performance is desired. With such approaches, it has been suggested that an engine with a relatively small power reserve could provide improved driving power under peak demands and a larger engine could be operated in a more fuel efficient range when accelerating.

Generically, these former systems have all required some type of monitoring device to sense vehicle or engine performance, and a control system for disengaging the accessory from the driving engine when a predetermined performance condition is met. By way of example, U.S. Pat. No. 4,305,258 to Spencer suggests using a mercury switch as an "accelerometer" to sense a threshold level of vehicle acceleration. When the vehicle is cruising with the air conditioning system on, the clutch is activated in its normal manner to effect engagement with the engine. Under conditions of sufficient acceleration, it is said that the mercury switch will have its orientation changed by an amount that is sufficient to close an electrical circuit; the circuit will then deactivate the clutch, thereby turning the compressor off. The spencer circuitry can include a timing delay to prevent very brief accelerations from deactivating the clutch. Presumably such a timing delay might also prevent unnecessary deactivation of the clutch as a result of vibrations imparted to the vehicle by rough road conditions.

A feature of systems that respond to vehicle dynamics is that they react to remove the accessory load only after engine output and fuel intake have significantly increased. Initially, while the accessory is still loading the engine down, the engine must work extra hard to accelerate the vehicle. It is only after the vehicle has begun accelerating that full engine power will be allocated to the acceleration. That is, once a threshold level of acceleration has been sensed for a predetermined time period, the engine is relieved of the accessory load. The associated change in engine speed (measured in revolutions per minute and commonly abbreviated as RPM) when the accessory is cut off may cause a jerking-type motion of the vehicle; for those vehicles equipped with automatic transmissions, a jerking change can possibly initiate an undesired and sudden down-shift to a lower gear.

An alternative approach is to monitor when the engine output increases to a level indicative of a significant acceleration. Certain indicators of change in engine dynamics, e.g., increasing RPM or manifold pressure, can be readily sensed to identify conditions characteristic of increasing output. In this regard the system proposed in U.S. Pat. No. 4,369,634 to Ratto for cutting off an air conditioning compressor incorporates a Bourdon tube operatively connected to move in response to changes in engine intake pressure. Such a vacuum-sensitive device can be linked to a mechanical switch in an electrical circuit to momentarily disable the compressor clutch from the engine only during intervals of peak performance.

A further refinement based on these approaches incorporates a pair of monitoring switches, each set to trip at a different threshold value. As suggested in U.S. Pat. No. 4,391,242 to Mashio, such a system may incorporate a pair of pressure switches coupled to timing-/decision circuitry. Each switch could be activated at a different pressure value, and the time interval required for the manifold pressure to change between the two values can be used as a criterion for suspending operation of the accessory device. The rate at which the manifold pressure increases from one value to another might be indicative of the rate of change in engine loading and have a positive correlation with the rate of change in vehicle acceleration. Accordingly, operation of the accessory load would be suspended when the time interval between two manifold pressure levels is less than a value which suggests a rapid change in acceleration.

Ideally, any system for disengaging a powered accessory (such as an air conditioner) from a vehicle's engine should be adjustable in order to set desired variables, e.g., economy and comfort, in view of engine and vehicle parameters—and expected operating conditions. At a minimum, these adjustments would be preset by the manufacturer upon installation of the system in a vehicle. However, when the accessory is an air conditioner or a window defogger, frequent readjustment of the system may be often required in order to assure sufficient operation of the accessory under specific vehicle loadings and weather conditions. As a practical matter, any adjustment in the system ought to be under the direct control of the vehicle operator, so that any necessary trade-off between improved driving performance and acceptable accessory operation might be managed.

In the past, systems for automatically cutting off accessory devices have required a mechanical linkage between the chosen monitoring device (e.g., a speedometer, accelerometer or Bourdon tube) and the switching circuitry which controls engagement of the accessory clutch. If this primary linkage were to be housed entirely within the engine compartment, then a remote control means or a secondary linkage reaching from the driver's console to the engine area, would be necessary in order to permit adjustment of the trip point during vehicle operation. In view of these requirements, the commercial success of systems that have the goal of improving vehicle performance by "cutting off" accessory equipment under certain operating conditions has been limited by the cost and inconvenience associated with installation. That is, as an original equipment option, purchase of the system may appear uneconomical to the vehicle owner. As an "aftermarket" purchase, prior art systems have probably seemed even less attractive—due to the expense associated with providing a mechanical linkage and routing it to the driver compartment in the same manner as other linkages that are normally used for dashboard control of vehicle air conditioning and heating systems.

SUMMARY OF THE INVENTION

In view of the above-noted disadvantages of prior art systems, a more economical and convenient approach has been needed in order to provide an adjustable system for improving vehicle performance. Such a system is now provided to permit vehicle operators to select the level of economy and, therefore, the extent to which accessory equipment may be temporarily cut off—based on multiple variables. These variables include engine loading and passenger comfort.

According to the invention a user-adjustable control system monitors an electrical signal indicative of intake manifold pressure in an internal combustion engine. The system automatically disengages engine power to an accessory based on threshold changes in the electrical signal. Generally a transducer is positioned to provide an electrical output signal indicative of pressure changes in the engine manifold. The pressure changes and, in turn, the signal changes are indicative of changes in engine load conditions. Electronic circuitry compares the transducer output signals with a preset value, and a relay is provided to selectively disengage the accessory from engine power—based on the results of the comparison. The circuitry provides a control signal to the relay in order to disengage the accessory from engine power when the transducer output signal is less than the preset value. The circuitry includes electrical input means for modifying the preset value while the engine is running, in order to adjust the pressure at which the relay disengages the accessory.

In one application of the invention, the accessory is an air conditioning compressor and the engine is utilized to simultaneously power the compressor and the drive train of an over-the-road vehicle. The electronic circuitry operates to disengage the compressor when the difference between manifold and atmospheric pressure drops below a preset value. The system improves vehicle driving performance by selectively restricting the diversion of engine power from the drive train to operate the air conditioning compressor. When no power is diverted to the compressor, all of the engine's power is available to move the vehicle. The system is relatively compact, inexpensive and easy for a vehicle owner to install. Operation is relatively insensitive to changes in atmospheric pressure; performance is therefore not affected by changes in altitude.

BRIEF DESCRIPTION OF THE FIGURES OF THE DRAWING

FIG. 2D is a detailed schematic of exemplary circuitry for implementing the embodiment of FIG. 2C;

DETAILED DESCRIPTION OF THE INVENTION

In the description that follows, preferred embodiments of the invention are disclosed for improving the operating performance of a vehicle powered by an internal combustion engine. Although the invention is not so limited, it is assumed for illustrative purposes that the engine is mounted in and powers a wheeled vehicle, and more particularly, an over-the-road vehicle such as a car or truck.

Figure 1A:
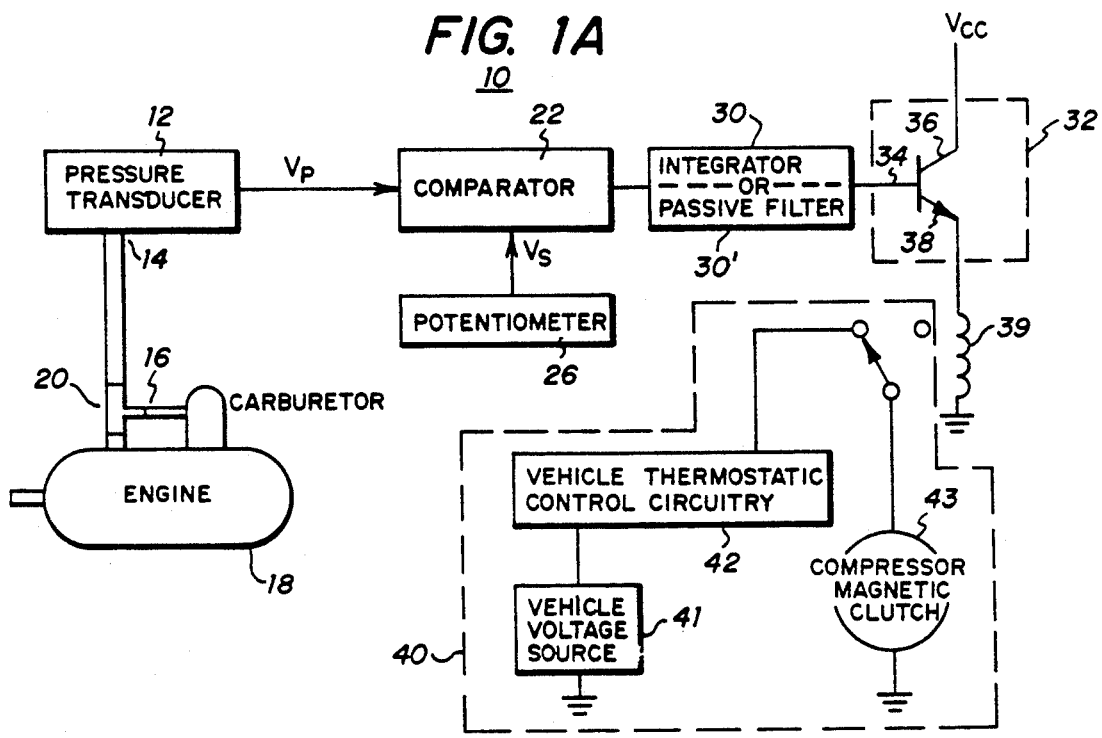
FIG. 1A is a general illustration of a user-controllable electronic system according to a first embodiment of the invention.
Figure 1B:
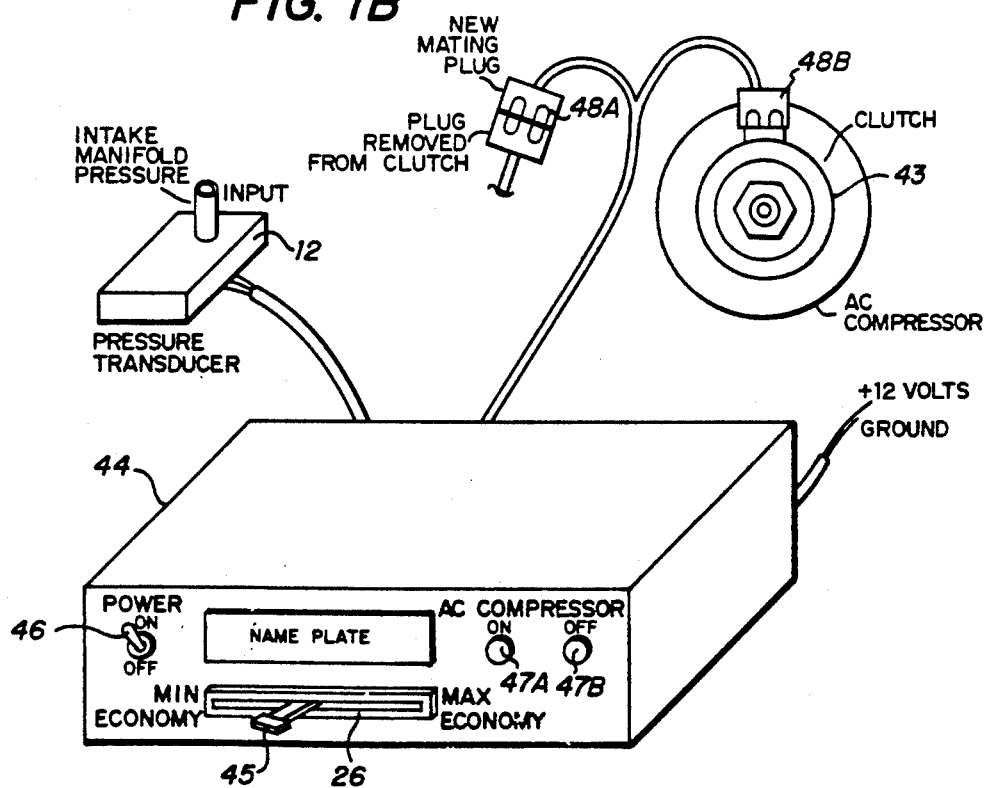
FIG. 1B is a partial schematic view of a console control box and connections thereto according to the embodiment of FIG. 1A.

With reference first to FIGS. 1A and 1B, and in accordance with a first embodiment of the invention, a user-controllable electronic system 10 is applied to selectively disengage the clutch control circuitry of an accessory device such as an air conditioning compressor. A differential pressure transducer 12 has an input 14 connected to measure pressure, relative to atmosphere, in a vacuum line 16 that is connected to the intake manifold of an internal combustion engine 18. The vacuum line 16 may be an original equipment item, such as a vapor line that is commonly connected between the intake manifold (below the carburetor) and the valve cover. Thus, the transducer 12 can be operatively connected to the engine by inserting a simple T-shaped hose connector 20, as schematically shown in FIG. 1A.

The transducer 12 may be physically mounted on any convenient structure in the engine compartment.

The transducer 12 may be of the semiconductor strain gauge variety. A suitable transducer for this application is a Model PX184-015V5V transducer manufactured by Omega Engineering, Inc. of Stamford, Conn. It is temperature compensated and exhibits a suitable linearity—within two percent over a dynamic vacuum range from zero to thirty inches of mercury. More precise transducers are available, of course, but their extra cost is not believed to be justified for this application. Regardless of the type or brand selected, it is desirable that the transducer 12 be one that operates directly from a 12 volt input.

The transducer 12 provides an output voltage Vp indicative of the manifold pressure to one input of a comparator 22. The comparator 22 includes a second input connected to receive a selectable voltage Vs from an adjustable set-point potentiometer 26. The comparator 22 outputs either a low (e.g., minus six volts) signal, a zero signal, or a high (e.g., plus six volts) signal, depending on the magnitude of Vp with respect to Vs. For example, let it be assumed that the transducer 12 supplies a signal ranging from zero volts at atmospheric pressure to plus six volts at 30 inches of mercury. The potentiometer 26 produces a signal ranging from zero volts to minus six volts, depending upon the selected cutoff point. When the magnitudes of the transducer signal and the potentiometer signal are compared, the comparator output will be zero volts if the two input signals are equal in magnitude but opposite in polarity. If the transducer signal is larger in magnitude and opposite in polarity—in comparison with the potentiometer signal, the comparator output will be minus six volts. If the transducer signal is lower in magnitude and opposite in polarity, the comparator output will be plus six volts. This output voltage is then integrated (by integrator 30) to provide a smooth signal for switching transistor 32.

It will be seen that the selectable voltage available from the potentiometer 26 provides a reference level to the comparator that is indicative of a desired threshold switching level, and this reference level may be adjusted at will by the operator, while the vehicle is parked or while it is traveling along a road. When the comparator 22 receives a transducer signal Vp equal to or less than Vs, indicating that the manifold differential pressure has dropped below the threshold minimum, the comparator outputs a voltage-low signal of, say, minus six volts, to an integrator 30, or more simply, to a passive filter.

The integrator 30 is coupled to a relay driver, here represented simply as a bipolar switching transistor 32 having the base 34 connected to receive the integrator voltage output. The transistor collector 36 is coupled to receive a supply voltage Vcc, and the emitter 38 is tied to the control input of a single pole, double throw relay coil switch 39. The switch 39 may be set in either an open position A or a normally closed position B. When set in the closed position B, the switch 39 is in series with the 12 volt circuit 40 formed by the vehicle voltage source 41, clutch control circuitry 42, and the compressor magnetic clutch 43. The clutch 43, of course, is an integral part of a conventional vehicle air conditioning system; it is mounted on the housing of the compressor to engage or disengage the compressor, and usually responds only to signals generated by a thermostat inside the passenger compartment.

When the engine that drives the vehicle also powers one or more major power-consuming accessories (such as an air conditioning compressor), the signal Vp may, depending on the level of engine loading, be greater or less than Vs. If the transducer 12 outputs a signal Vp higher than Vs, the comparator outputs a voltage-low signal to the integrator 30 (or a passive filter) and the switch 39 remains closed. On the other hand, when Vp drops below the adjustable setting Vs, the comparator output to the integrator 30 rises to a voltage-high level; this raises the base 34 input voltage as to place the transistor 32 into conduction, thereby opening the switch 39. Thus, the accessory load is automatically removed from the engine when the engine loading increases beyond the programmed level defined by the adjustable potentiometer 26.

A notable feature of the invention is that the value of Vs can be varied by the vehicle driver while sitting in the driver's compartment, such that the system 10 will disable the compressor clutch in response to a greater or lesser threshold change in differential manifold pressure, as determined by the comparator 22. This electrical control, in lieu of a mechanical linkage, governs the responsiveness of the system 10 to changes in manifold pressure. Furthermore, an electrical adjustment means, e.g., the potentiometer 26, can be remotely positioned from both the pressure monitoring device and the vacuum line connection.

FIG. 1B figuratively illustrates connections to a console control box 44 which houses portions of the system 10. The control box 44 is suitable for dashboard mounting or custom installation on the instrument panel of an automotive driving compartment. In the present embodiment the comparator 22, the integrator 30, and the relay driving transistor 32 are all conveniently housed in the control box 44. The illustrated potentiometer is of the linear slide type (such as model P2333 available from Allied Electronics), comprising a graduated control knob 45 for driver adjustment of the set-point voltage Vs.

A power switch 46 allows the driver to turn the system 10 ON and OFF. When the system is ON, a yellow light emitting diode (LED) display 47A indicates whether the compressor is in operation. A green LED display 47B indicates periods during which the system 10 is operating to disengage the air conditioner clutch. Expressed in other words, an illuminated LED 47B provides visible evidence to the vehicle operator that the relay coil switch 39 has opened, thereby rendering the vehicle's original control circuitry 42 temporarily ineffective—as far as actuating the compressor control clutch 43.

Positioning the potentiometer 26 conveniently within the driver console area enables the driver to adjust the set-point voltage while operating the vehicle. Providing such direct access to the potentiometer 26 during vehicle operation is necessary in order to maintain control over variables such as driver comfort as vehicle operating conditions change. For example, when driving in a stop-and-go traffic environment or when driving over hilly terrain, it may be more important to allocate reserve power to the vehicle drive train than to an air conditioner/defroster system. On the other hand, under comparable load conditions but during the intense heat of a summer day, the driver may choose to place greater emphasis on maintaining passenger comfort than on conserving overall engine power. This may be especially true if a passenger riding in the vehicle is very old, very young, ill or otherwise unable to tolerate the increase in temperature that will inevitably result from turning off the vehicle's air conditioner. Any increase in interior temperature (when the compressor is turned off) can be minimized if the system 10 is installed by the vehicle's original manufacturer, and if the reservoir of cooling liquid is made larger than is currently the practice. That is, increasing the quantity of liquid that is cooled when the compressor is operating will mean that more cooled liquid is available to absorb heat when the compressor is temporarily turned off by the system 10.

A suitable choice of the potentiometer 26 will enable a driver to adjust the tradeoffs between economy and comfort with whatever degree of sensitivity seems to be desirable. For example, the preferred slide-type potentiometer can readily provide a two-inch range of movement for the driver to select a desired level of economy at a glance. Adjustment can be effected by simply sliding the knob 45 with the same ease that a driver routinely adjusts the desired output from a heater or an air conditioner. Alternatively, a rotary potentiometer could be selected, so long as it provides an adequate ratio of turns per unit change in voltage to assure the desired sensitivity.

Assuming the system 10 is applied to selectively disengage the compressor of an air conditioner (in the summer) or a defroster (in the winter), the level of economy associated with engine operation can be adjusted while the vehicle is in motion simply by manipulating the control knob 45 located on the instrument panel. Hence the driver can quickly make whatever adjustments are felt necessary to assure passenger comfort; or the driver may change his or her mind at any time and opt for more efficient vehicle operation by tolerating an increase in interior temperature of the vehicle. In combination with a conventional cruise control, this system 10 provides further economy for drives who do not recognize the effects of trying to maintain a constant vehicle speed (including, for example, operating an air conditioner) while driving up a hill. A conventional cruise control circuit will automatically increase engine power to maintain constant vehicle speed while traveling up a hill. The disclosed system 10 reduces some of the engine load under these circumstances in order to more economically maintain constant speed when hill climbing. Furthermore, many vehicles have an automatic overdrive; and when the load increases, the transmission automatically downshifts. By temporarily dropping the load of a compressor, the system 10 can advantageously prevent the cruise control system from effecting a downshift from overdrive when a vehicle moves up an incline.

In constrast to the system 10, a system which mechanically controls engine operation with a Bourdon tube or a mercury switch would either require extension of the mechanical linkage into the driver compartment or formation of an additional linkage for remote adjustment of the trip point at which the associated control circuit is to be disabled. Thus, the electrically controllable adjustment of the system 10 overcomes limitations of the mechanically-based arrangements for removing load devices under conditions of vehicle acceleration. Because of its relative simplicity, the system 10 may also be favorably compared with very sophisticated—but much more complicated—systems such as the one shown in U.S. Pat. No. 4,688,530 to Nishikawa et al. entitled "Control System For Engine-Operated Automotive Accessories."

Another feature of the potentiometer 26 is that the set-point voltage Vs can be varied over a full range of values to provide a minimum value (i.e., zero) for most economical operation, and a maximum value that assures operation of the accessory load without interruption by the system 10, i.e., under all operating conditions.

FIG. 1B also illustrates the ease with which a conventional air conditioning system in a vehicle can be modified to accommodate the system 10. By way of example, there are mating connector plugs 48A and 48B in many automobiles which couple the output from the clutch control circuitry 42 with the input to the compressor control clutch 43; this clutch is located in the pulley housing of the compressor 49. With such an arrangement, the system 10 can easily be incorporated by providing an additional pair of connector plugs to mate with plugs 48A and 48B; these new plugs wire the relay coil switch 39 (housed in the control box 44) in line with the clutch control circuitry 42.

Figure 1C:
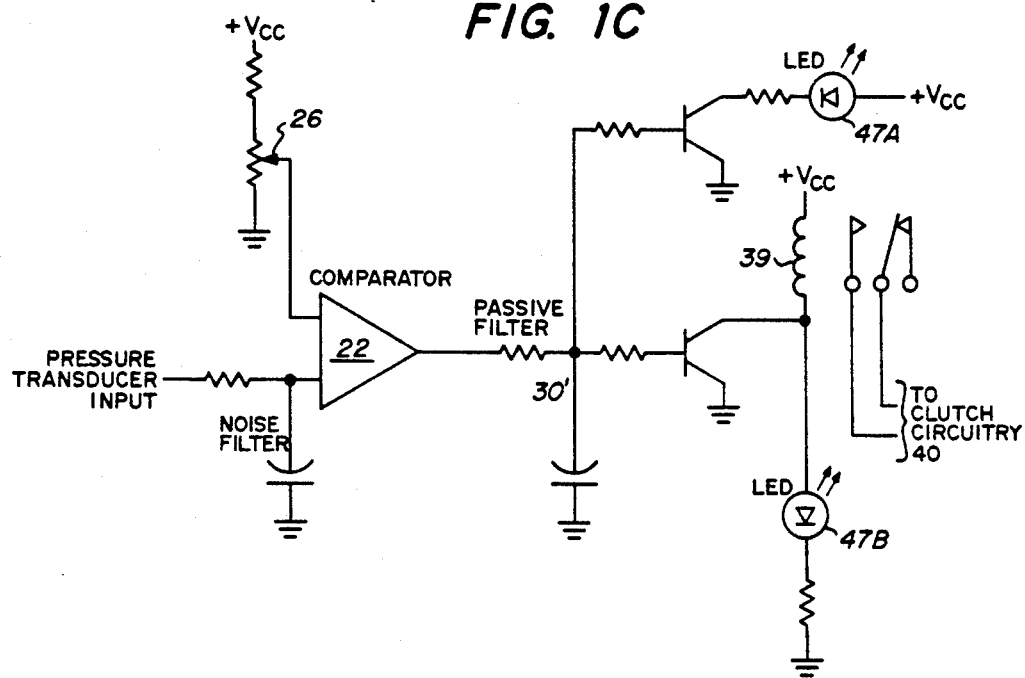
FIG. 1C is a detailed schematic of exemplary circuitry for implementing the embodiment of FIG. 1A.

Still another feature of the system 10 is that the integrator 30 (or simply a passive filter 30') will provide a delayed response to the relay driving transistor 34, in order to dismiss transient changes in manifold pressure that cause Vp to drop below Vs for very brief periods. The integrator 30 or filter 30' can be selected or adjusted to require that Vp be less than Vs for a predetermined time period, e.g., several tenths of a second, before actuating the relay switch 39. Without the integrator 30, or at least a filter, the system 10 would attempt to respond to rapid, perhaps millisecond, fluctuations output by the comparator 22. FIG. 1C is a detailed electrical schematic of a specific implementation for the system 10 shown in FIG. 1A. This example illustrates use of a passive filter 30' in lieu of the integrator.

Figure 2C:
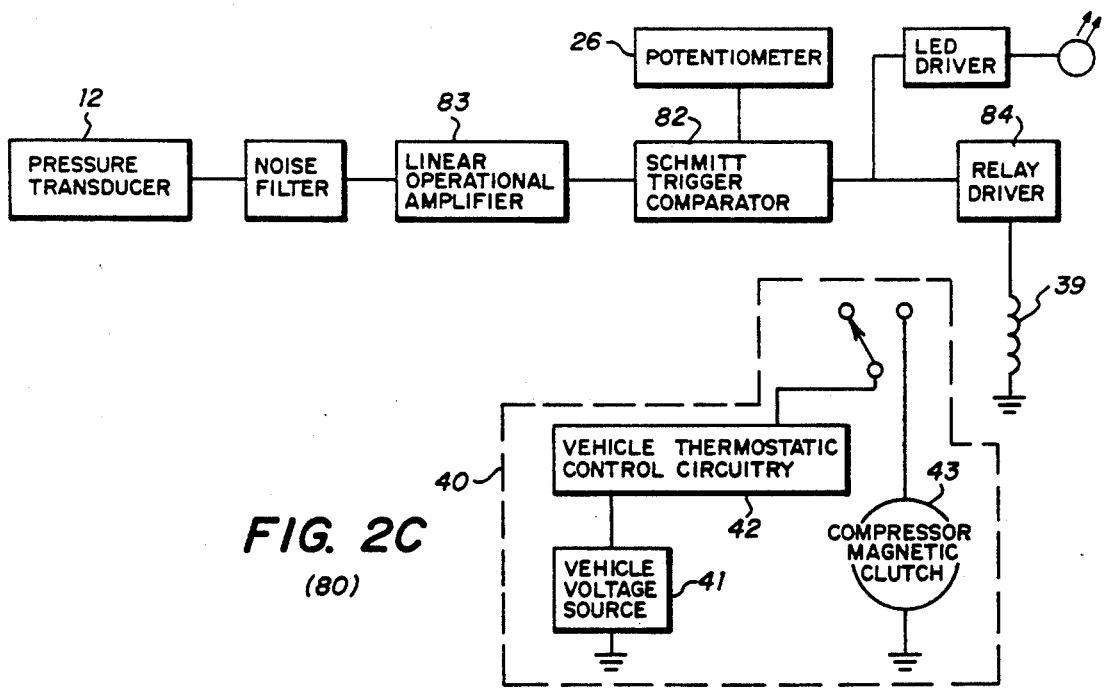
FIGS. 2A-2C illustrate the user-controllable electronic system according to alternate embodiments of the invention.
Figure 2A:
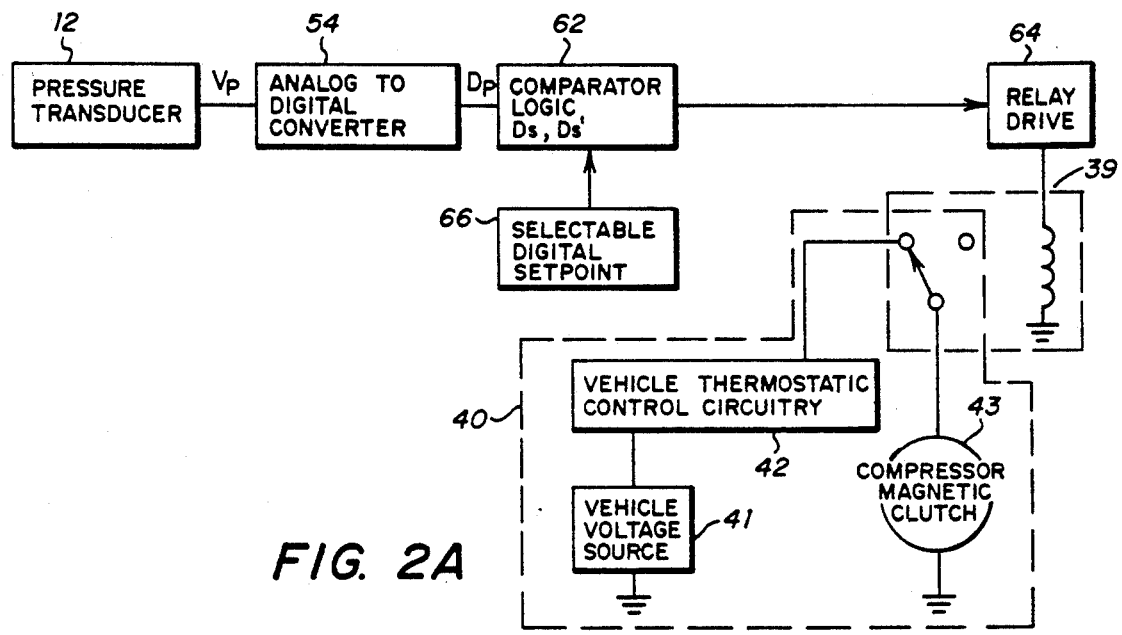

FIG. 2A illustrates a digitally based version of the invention. The system 50 is similar in function to the system of FIG. 1. In this second embodiment the analog signal output by the differential pressure transducer 12 is fed through an analog-to-digital converter 54 to provide a digital representation of the transducer output signal, designated Dp, to digital comparator logic 62. In lieu of a potentiometer, a digital signal provided by a linear action coded DIP switch 66 provides the comparator logic 62 with a set-point threshold signal Ds indicative of the minimum differential manifold pressure Vp. The comparator outputs a less than Ds.

Figure 2B:
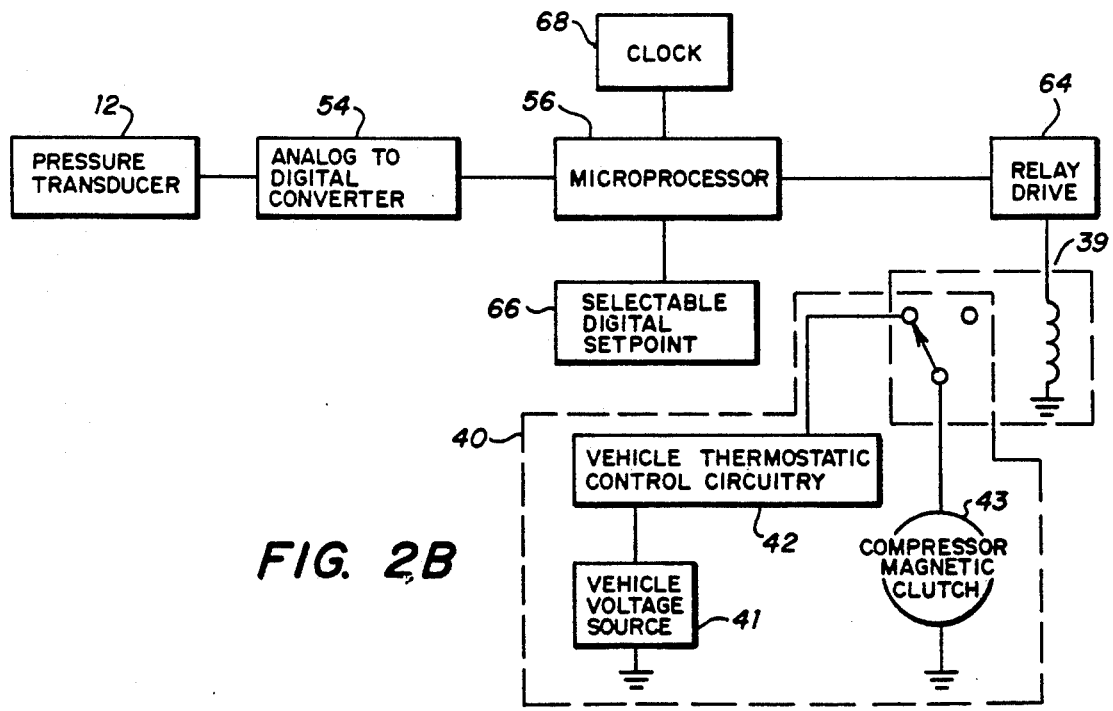

When the comparator logic 62 outputs a logic-high signal, a relay driver circuit 64 opens the normally closed switch 22 in the circuit 24, thereby removing the power supply from the clutch control and actuator circuitry 42. In lieu of an integrator for eliminating the effects of transients sensed by the transducer 12, the comparator logic 62 can include, for example, adjustable timing logic to require that Dp be less than Ds for a predetermined time before a logic-high signal is output to the relay driver circuit 64. FIG. 2B illustrates that these same functions can be readily performed by replacing the comparator 62 with a microprocessor 56, a clock generator 68 and a programed ROM (not shown).

An additional feature of forming the digital embodiment of FIG. 2 with a microprocessor is that the threshold condition Vs could be programmed as a function of other parameters, including vehicle speed, the temperature of the passenger compartment, and outside (ambient) temperature. The control box for the digitally based systems of FIGS. 2A and 2B closely resembles the control box 44 illustrated in FIG. 1B. The slide-type potentiometer 26 would be replaced with a slide-type linear action coded dip switch such as model 79A10 available from Allied Electronics. Thus, the value of Ds would be selectable by the vehicle operator via a slide control knob 45 to prescribe a digital signal indicative of minimum differential pressure—corresponding to a desired comfort level or corresponding to a specific level of engine economy.

An advantage of the embodiments illustrated in FIGS. 2A and 2B is the provision of a deadband to prevent the clutch in the actuator circuitry 42 from engaging at a manifold pressure that immediately shifts Vp back into a range which causes the comparator logic 62 to again transmit a logic-high signal to the relay 39. To prevent a cyclic action that might be described as chatter, the logic 62 further includes a distinct criterion requiring Dp to reach a level Ds', which is greater than Ds, before the comparator output signal shifts back to a logic-low output. In other words, before the logic 62 enables the relay 39 to close the circuit 40, the partial vacuum in the intake manifold must return to a pressure significantly lower than that pressure corresponding to Vp. Thus, the comparator logic 62 requires a first criterion, i.e., Dp less than or equal to Ds, in order to shift from a logic-low output to a logic-high output; a second criterion, i.e., Dp greater than or equal to Ds', is required in order to shift back from a logic-high output to a logic-low output.

Although Ds is illustrated as a user-adjustable parameter which is controlled while driving the vehicle, Ds' should require one-time adjustment during set-up of the system 50; the adjustment could be effected with jumper pins on a circuit board containing the comparator logic and the signal generator 66. In practice, the jumper pin adjustment would provide an increment value which the comparator logic adds to Ds in order to establish Ds'.

For large horsepower engines this deadband value, i.e., the increment value corresponding to Ds' minus Ds, would relate to relatively small pressure difference, because the added load put on the engine when the clutch engages is relatively small compared to the total engine output. In contrast, the compressor load requires a larger percentage of the output from a low horsepower engine, and such load will cause a larger shift in manifold pressure as the clutch engages. Thus, the deadband value for a low horsepower engine would be larger than the deadband for a large horsepower engine, and the increment adjustment for establishing Ds' could be established from a table.

The advantages of a deadband as discussed with reference to FIGS. 2A and 2B can also be realized in linear circuit embodiments of the invention. For example, the system 80 of FIG. 2C, while similar in arrangement to the system 10 of FIG. 1, further includes a Schmitt trigger comparator 82 coupled between a linear operational amplifier 83 and the relay driver circuit 84. The circuit 84 comprises a switching transistor such as the transistor 32 of FIG. 1A. In this example, the Schmitt trigger comparator prevents the transistor 32 from turning on until a manifold pressure is reached that is lower than the manifold pressure for which the transistor turned off. For example, the Schmitt trigger 82 might send a signal to the relay driver circuit 84 to maintain the compressor clutch engaged down to a pressure transducer signal of 5 volts, equivalent to a manifold pressure of of 14 inches of mercury. But once disengaged, the Schmitt trigger would not allow the clutch to re-engage until the transducer signal was at 5.5 volts, equivalent to a manifold pressure of 16 inches of mercury.

Each of the systems disclosed herein is particularly adaptable to be combined with an existing automotive vehicle as an "after-market" item, because each can be added so easily to any vehicle. Of course, each circuit could also be incorporated by an original equipment manufacturer into any automotive or truck system that has a carburetor or an equivalent device to which the pressure transducer may be coupled.

Figure 3A:
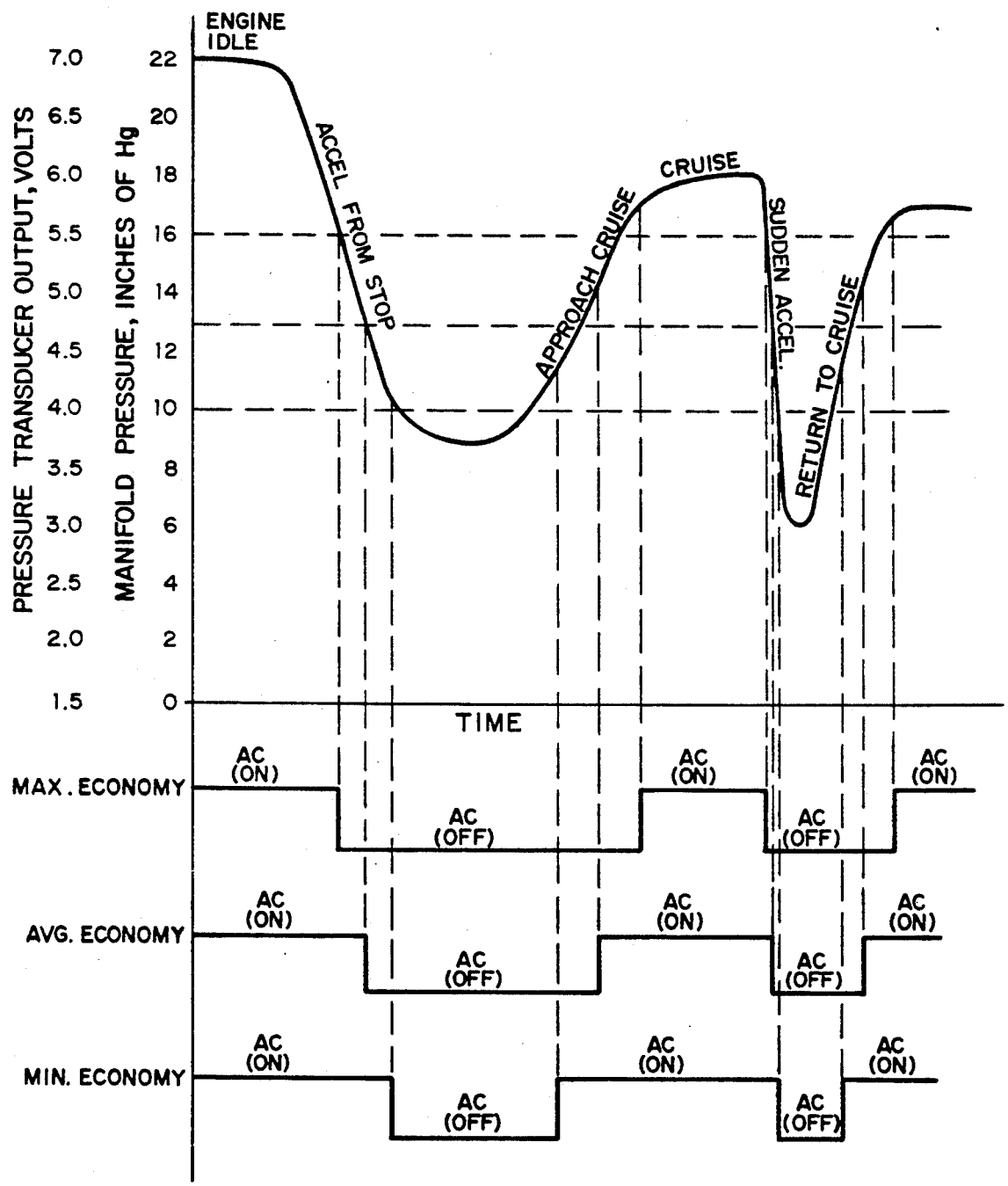
FIGS. 3A-3B qualitatively illustrate operative advantages of the invention.
Figure 3B:
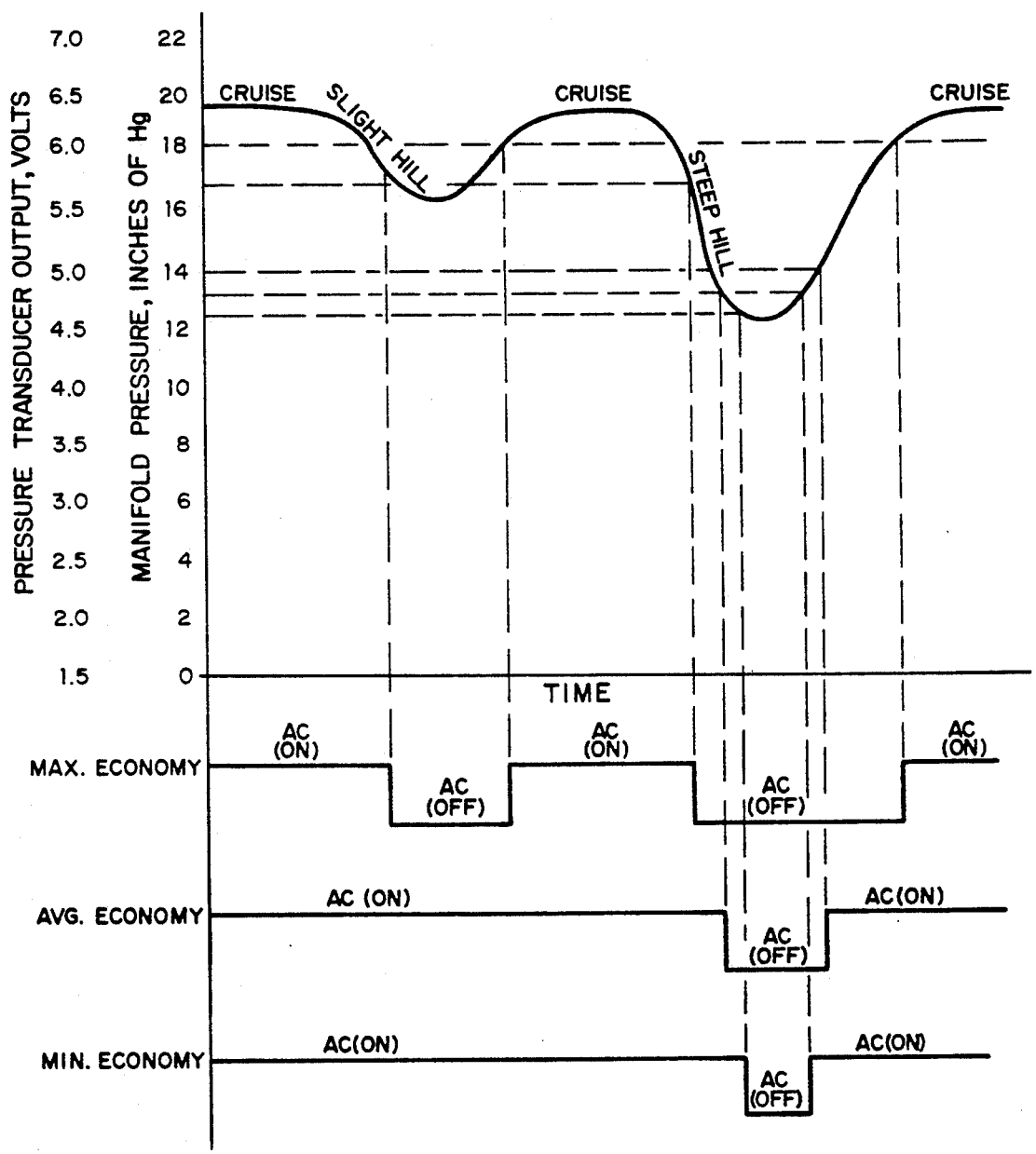

FIG. 3 provides a qualitative representation of expected operation of an embodiment of an user-adjustable control system featuring a deadband such as discussed with reference to any of FIGS. 2A, 2B and 2C. The features of FIG. 3A do not reflect the characteristics of any specific engine design, but are set forth to generally depict the manner with which the described system can alter power diversion to an accessory as a function of dynamic manifold pressure. A deadband value of one inch of mercury is illustrated.

In this example it is assumed that the control system is installed in an automobile having a small engine and an automatic transmission. Engine idle, measured while the vehicle is stopped in gear, corresponds to a more or less steady state manifold differential pressure of 22 inches of mercury; this also corresponds to a pressure transducer output signal of seven volts. The changes in differential pressure and transducer output voltage are plotted with respect to this idle condition for a typical sequence of vehicle dynamics. That is, the engine first accelerates the vehicle from stop, as reflected by a relatively abrupt decrease in differential pressure of approximately eight inches of mercury. The engine then decreases the rate of acceleration as the vehicle approaches a cruising speed, resulting in a differential pressure of approximately eighteen inches of mercury. FIG. 3A also illustrates a brief, abrupt and heavy acceleration (as might be experienced when a driver speeds up to pass a vehicle), causing the differential pressure to drop to six inches of mercury. This is followed by an increased to seventeen inches of mercury, indicative of a final cruising speed somewhat higher than before the acceleration.

System operation is illustrated for three different settings of the user-adjustable control knob 45, corresponding the maximum economy, average economy and minimum economy. For example, at maximum economy, $D_s$ corresponds to a transducer output of 5.5 volts or a differential pressure of 16 inches of mercury. With a deadband value of one inch of mercury, $D_s'$ is set to 6 volts or 17 inches of mercury. At such a setting, when the transducer output falls below the threshold value of 5.5 volts, the relay coil switch 39 operates to disable the air conditioning clutch control circuitry 42. The circuitry remains diabled until the transducer output signal reaches 6 volts. The "minimum" curve at the bottom of the figure shows that the air conditioner compressor would be turned off for a relatively short period of time, as compared with the off time for a setting to achieve maximum economy.

Figure 4:
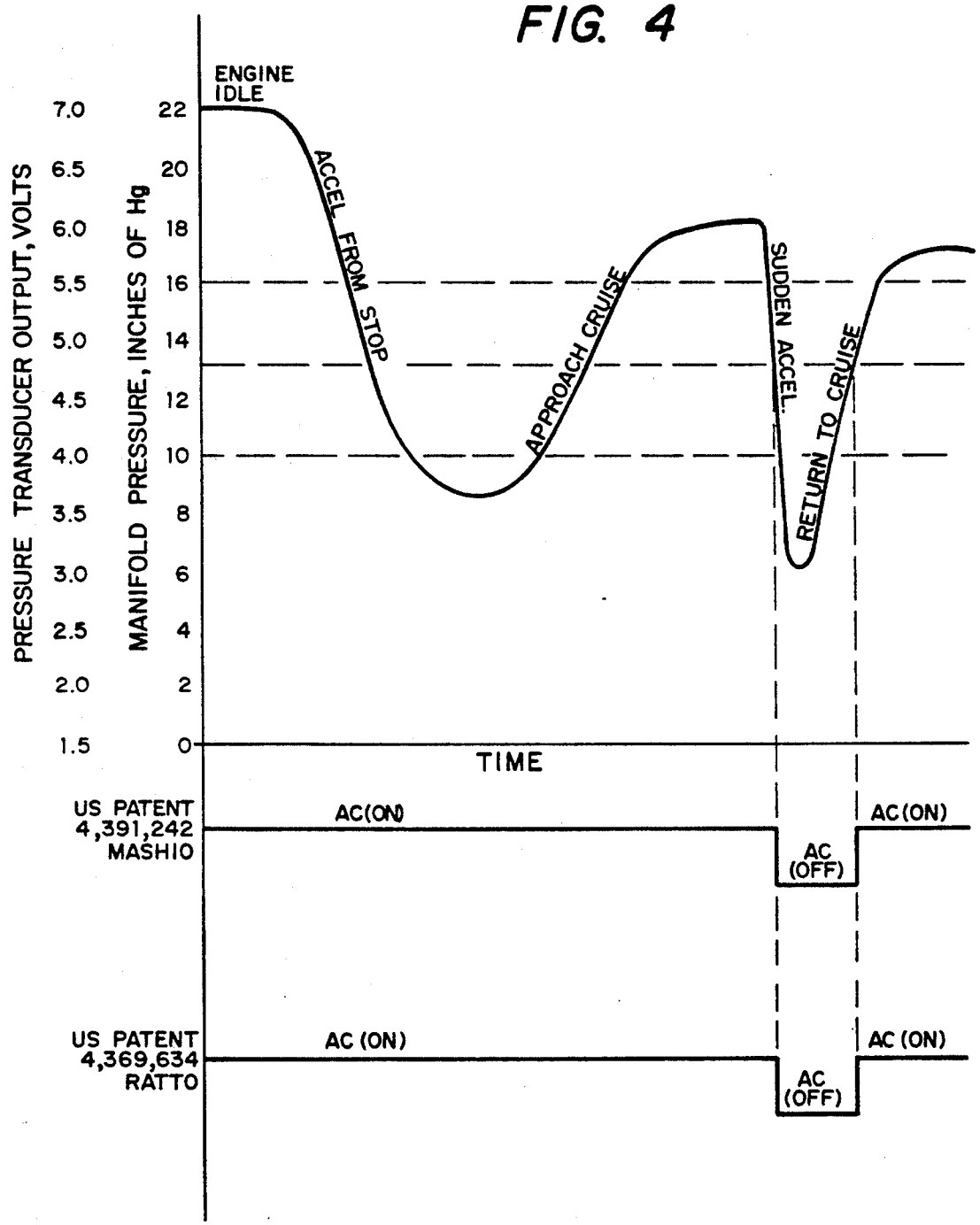
FIG. 4 illustrates operation of a prior art system for allocating engine power between a vehicle drive train and an air conditioning compressor.

Of course the ultimate in economy may be realized by having the driver exercise individual judgment and simply reach over and turn off the air conditioner every time that he or she anticipates that there will be a need for directing all of an engine's power to the drive train. But the nuisance of turning an air conditioner on and off, as well as the risk of diverting the driver's attention from what may be a high-risk situation (like passing another car on a two-lane road), seems to justify an "automatic" system similar to the ones disclosed herein. With one of these systems, a suitable compromise is realizable between having as much cooling as can be reasonably expected while also having available—when needed—all of the engine's power that can be produced. In contrast to the operation of the above-described user-adjustable control system, FIG. 4 illustrates performance of a prior art system which operates at only one fixed value of differential manifold pressure to disable compressor operation.

It should now be apparent to those skilled in the art that certain preferred embodiments of the invention have now been disclosed herein in great detail. However, it should also be appreciated that the specific components and applications which have been described should be recognized as being illustrative and are not intended to limit the scope of the invention. Accordingly, the invention should be deemed to be measured only by the claims which follow.

What is claimed is:

1. A user-adjustable control system which monitors an electrical signal indicative of manifold pressure in an internal combustion engine, and which selectively disengages power to an accessory based on threshold changes in the monitored electrical signal, said system comprising:
   a) a transducer connected to provide an electrical output signal that is indicative of pressure changes in the engine manifold, said changes indicating changes in load conditions of the engine;
   b) a relay for selectively disengaging the accessory from engine power;
   c) electronic circuitry for comparing the transducer output signal with a preset value, said circuitry providing a control signal to the relay to disengage the accessory from engine power when the transducer output signal is less than said value, and said circuitry including electrical input means for selectively modifying said preset value to adjust the pressure at which the relay disengages the accessory.

2. The system of claim 1 wherein the accessory constitutes an air conditioning compressor and the engine is utilized to simultaneously power the drive train of an over-the-road vehicle as well as the air conditioning compressor, said electronic circuitry disengaging the compressor when the difference between manifold and atmospheric pressure drops below said preset value, and said system improving vehicle driving performance by selectively restricting the diversion of engine power from the drive train to operate the air conditioning compressor.

3. The system of claim 2 wherein the transducer is positionable entirely within a compartment housing the vehicle engine, and wherein said electrical input means is positionable within a separate compartment and within reach of the vehicle driver, such that the driver may modify said preset value while operating the vehicle.

4. The system of claim 3 wherein all of said electronic circuitry is located in the driver compartment of the vehicle, with the connections between said circuitry and the transducer including no fluid communication.

5. The system of claim 2 wherein said transducer measures differential pressure based on variations in the demand for engine power, and wherein the demand for engine power varies in direct proportion to changes in vehicle performance as a result of changing conditions including acceleration, cruise, passing and hill climbing.

6. The system of claim 1 wherein said transducer is connected to monitor differential pressure within the intake manifold relative to atmospheric pressure.

7. The system of claim 1 wherein the engine is coupled to the train of an automotive vehicle and the accessory comprises an air conditioning compressor, said compressor having a primary clutch that is responsive to signals generated by a thermostatically controlled switch, and said relay providing a secondary clutch control over the compressor to improve fuel economy by preventing power diversion to the compressor during periods of high engine output.

8. The system of claim 1 wherein said electronic circuitry comprises a difference amplifier configured to receive both the transducer output signal and said preset value as input voltages.

9. The system of claim 1 wherein said electronic circuitry comprises:
   a) a comparator for providing an intermediate signal indicative of the voltage difference between the transducer output and the predetermined value; and
   b) an integrator connected to receive the intermediate signal and generate said control signal in response thereto, said integrator reducing the effects of transient voltages present in the intermediate signal upon operation of the relay.

10. The system of claim 1 wherein said electronic circuitry comprises:
    a) an integrator for reducing the effects of transient voltages present in the transducer output signal as a result of relay operation; and
    b) means for preventing the relay from engaging the accessory to receive engine power unless the transducer output signal is a predetermined value greater than said preset value.

11. The system of claim 10 wherein means for preventing the relay from engaging the accessory comprises a Schmitt trigger.

12. The system of claim 1 wherein said electrical input means comprises a potentiometer for selectively modifying said preset value.

13. The system of claim 1 wherein said electronic circuitry comprises:
    a) an analog-to-digital converter for generating a binary representation of the transducer output signal;
    b) a switch for generating a digital representation of said preset value; and
    c) a comparator for providing a signal indicative of the voltage difference between the transducer output signal and said preset value.

14. The system of claim 13 wherein the comparator signal is an intermediate signal, and said circuitry further including:
    a) an integrator connected to receive the intermediate signal and generate said control signal in response thereto; and
    b) means for preventing the relay from engaging the accessory to receive engine power unless the binary representation of the transducer output signal is a predetermined value greater that the digital representation of said preset value.

* * * * *